United States Patent

[11] 3,634,622

| [72] | Inventor | Bryce A. Wheeler<br>Los Angeles, Calif. |
|---|---|---|
| [21] | Appl. No. | 830,590 |
| [22] | Filed | June 4, 1969 |
| [45] | Patented | Jan. 11, 1972 |
| [73] | Assignee | Hughes Aircraft Company<br>Culver City, Calif. |

[54] REMOTE VIEW AND DIRECT VIEW CAMERA-POINTING SYSTEM
11 Claims, 4 Drawing Figs.

[52] U.S. Cl. .................................................. 178/7.8
[51] Int. Cl. ................................................. H01j 29/02
[50] Field of Search ..................................... 178/7.8,
7.88, 7.89, 6.7; 356/4

[56] References Cited
UNITED STATES PATENTS

| 2,967,211 | 1/1961 | Blackstone et al. ............ | 178/6.7 |
| 3,432,219 | 3/1969 | Shenker et al. ................ | 178/7.88 |
| 3,435,140 | 3/1969 | Hueber et al. ................. | 178/7.81 |
| 3,505,465 | 4/1970 | Rees ............................... | 178/7.88 |

FOREIGN PATENTS

| 1,193,567 | 6/1970 | Great Britain ................ | 356/4 |
| 563,435 | 5/1957 | Italy .............................. | 178/7.89 |

Primary Examiner—Richard A. Farley
Assistant Examiner—N. Moskowitz
Attorneys—James K. Haskell and Allen A. Dicke, Jr.

ABSTRACT: The camera is an image-forming device which has an optical axis which is stationary with respect to a main frame, and the camera optical axis is directed to a mirror which rotates about the optical axis. The mirror forms a second optical axis at right angles to the camera axis. The second optical axis intersects with an optical objective and a second mirror. The second mirror is rotatable about the second axis. Thus, the image-forming device is able to see in any direction by mere rotation of the mirrors without changing the direction of the optical axis of the image former.

Upright image orientation is maintained by rotation of the image former on its axis as a function of rotation of the second mirror on its axes.

PATENTED JAN 11 1972

INVENTOR.
BRYCE A. WHEELER,
BY
Allen A. Dicke Jr.,
AGENT.

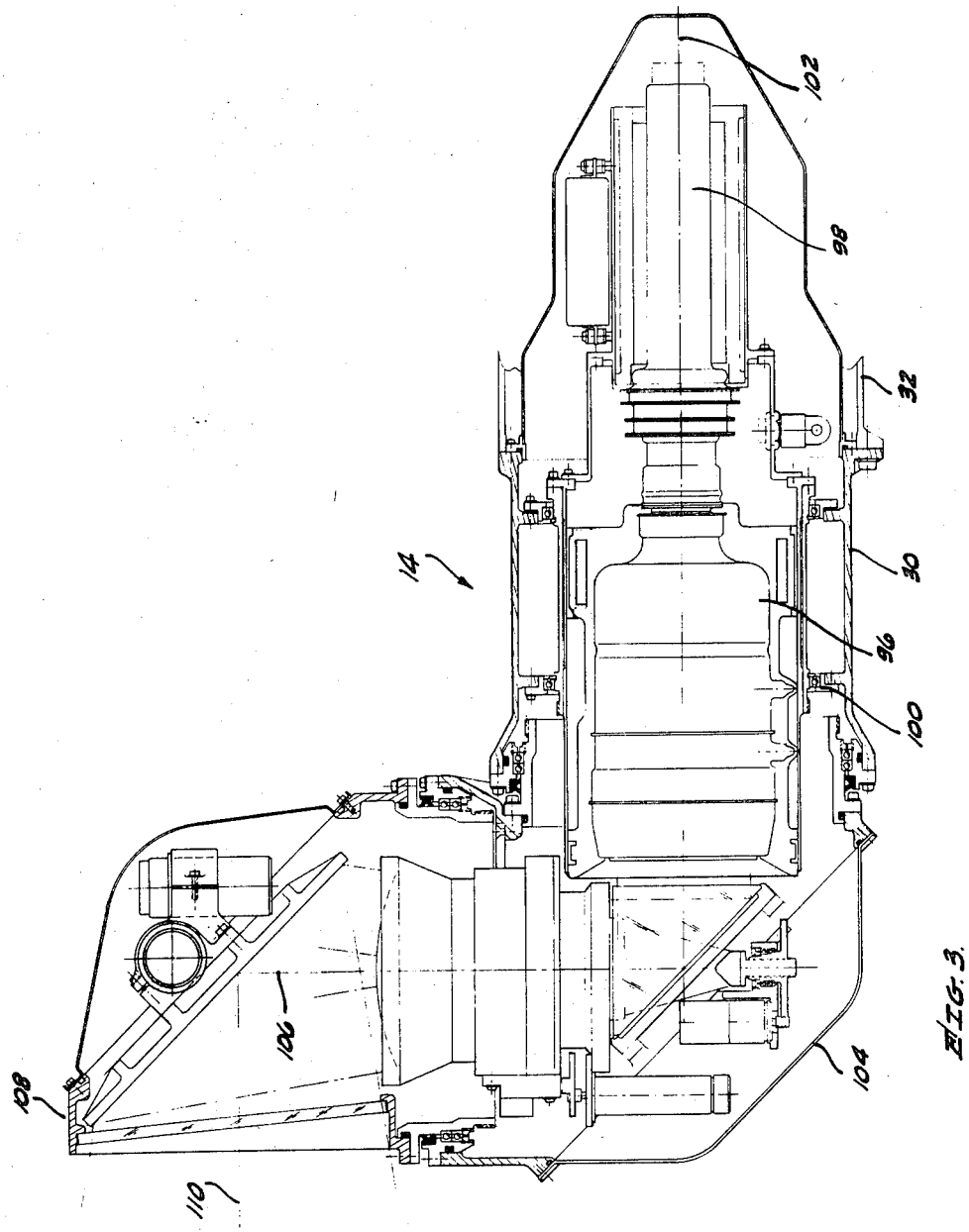

REMOTE VIEW AND DIRECT VIEW CAMERA-POINTING SYSTEM

The invention herein described was made in the course of or under a contract or subcontract thereunder with the U.S. Army, Department of Defense.

BACKGROUND

This invention is directed to a viewing device including a vidicon and a direct viewing device wherein the optical axes of the vidicon and the direct viewing device are permanently directed with respect to the main frame of the structure on which the viewing devices are mounted, and the optical axes are directed through mirrors rotating on different axes.

Image intensifiers are well known in the art. Such image intensifiers, including a vidicon on the rear end and an objective on the front end thereof are rather lengthy devices. Past efforts to mount them on vehicles included the employment of turrets. Such turrets necessarily include rotation on both azimuthal and elevational axes, if full vision is to be enjoyed, and thus such turrets must fully permit motion of the lengthy units. To accomplish this, the turrets must be large. When the image intensifier does not employ vidicon, but rather employs a fiber optic bundle, the relative lack of flexibility of the bundle requires a considerable length of the bundle to extend on rather large radii of curvature out of the rear of the image intensifier. Accordingly, turrets which would enclose such a structure are even more bulky. Turrets are necessary because of adverse wind-loading effects on precision optical pointing, damaging moisture and other contamination effects on camera and pointing operation, and the vibration resulting from full exposure to the elements. Such is particularly true if the mounting is to be on a helicopter or other air-worthy vehicle, where the air velocity effects on the system are significant.

Another problem of the prior art is the correction of image orientation, as seen by the viewer. Azimuthal and elevational viewing can be accomplished through mirrors rotatable at right angles to each other, as taught by this invention, but such results in apparent visual or viewing errors, particularly when the structure first makes it elevational rotation with respect to the main body, and then its azimuthal change. Correction of this observational error is accomplished by rotation of the image-forming device within the body, on its axis, without need for directing the image-forming device as is taught by the prior art. Accordingly, images are formed in their correct orientation, both for direct and remote view.

SUMMARY

In order to aid in the understanding of this invention, it can be stated in essentially summary form that it is directed to a remote view and direct view camera-pointing system, particularly a system where azimuthal and elevational view directions can be changed without moving the axis of the image-forming device. Such is accomplished by providing reflecting devices, such as mirrors or prisms which are rotatable on axes. Preferably, one of the axes is through the axis of the image-forming device and the other axis is at right angles thereto. In order to prevent rotational disorientation of the image as seen at the output of the image-forming device, the image-forming device is rotatably mounted upon its axis to reduce or eliminate rotational image disorientation.

Accordingly, it is an object of this invention to provide viewing devices wherein an imaging device can be optically pointed to view a scene so that the scene is produced on an imaging means, including the movable mounting of at least one mirror or other reflecting means so that the imaging device has a field of view which is enlarged by rotation of the mirror or other reflecting device on its axis to provide an enlarged field of view without swinging the axis of the image-forming device.

It is another object to provide a viewing system wherein a first mirror is rotatable about the axis of an image-forming device and a second mirror is rotatable at right angles to the first axis so that, by proper mirror rotation, an enlarged field of view can be seen by the image-forming device and by proper rotation of the mirrors on the axes, the desired field of view in the image-forming device can be obtained. It is still another object to provide position-sensing means on the output mirror so that the field of view seen by the image-forming device can be determined by the position-sensing means. It is still another object to provide means for rotating the image-forming device so that rotative error in the view seen on the image-forming device can be eliminated.

It is a further object to provide a rotatable image-forming device mounted in conjunction with mirrors so that, by mirror rotation and rotation of the image-forming device only on its axis, images in correct orientation are observed on the image-forming device. It is still another object to provide an image-forming device in the form of an image intensifier having a vidicon connected thereto so that low-light level images may be observed. It is still another object of this invention to provide such an image-forming device in the form of an image intensifier having a fiber optic rope or bundle attached thereto so that upon pure axial rotation of the image-forming device without rotation of the output of the bundle, the image seen at the output of the fiber bundle is in the correct orientation. Other objects and advantages of this invention will become apparent from a study of the following portion of the specification, the claims and the attached drawings.

BRIEF DESCRIPTION OF THE DRAWINGS

FIG. 3 is an enlarged partial front elevational view and partial section taken generally along the line 3—3 of FIG. 1.

DESCRIPTION

Figure 1:
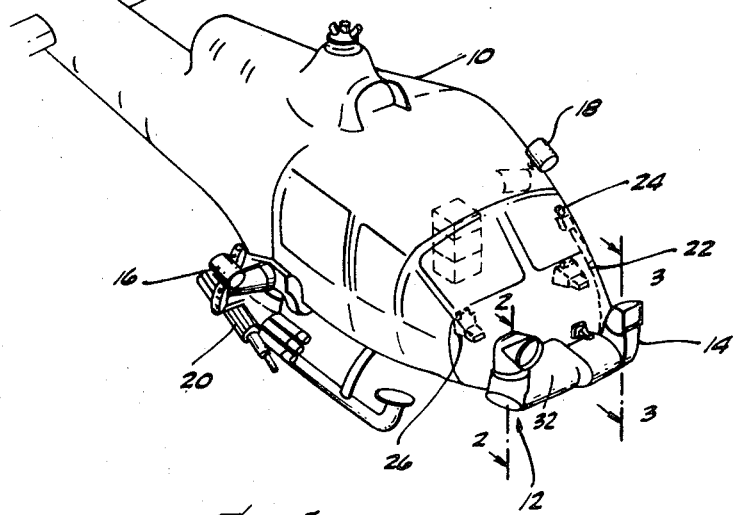
FIG. 1 is a partially schematic, isometric view of an airborne vehicle carrying the remote view and direct view camera-pointing systems of this invention.

FIG. 1 illustrates a vehicle 10, in this case a helicopter, upon which the camera-pointing system of this invention is mounted. The camera-pointing system includes remote view camera 12 and direct view camera 14, mounted together upon the nose of the helicopter. The cameras include image intensification so that they act to aid the night vision of the helicopter occupants. In addition, the vehicle 10 carries searchlights 16 and 18 which are directable in the direction that at least camera 12 is pointing. In the present case, camera 12 is directed by the gunner, and points in the same direction as the flexibly mounted guns 20. The searchlights are mounted on the gun so that they point in the same direction as the guns and the camera 12. Of course, the searchlights could be directed independently of any guns, simply by appropriately connecting them to be driven in the same direction as the camera.

Figure 2:
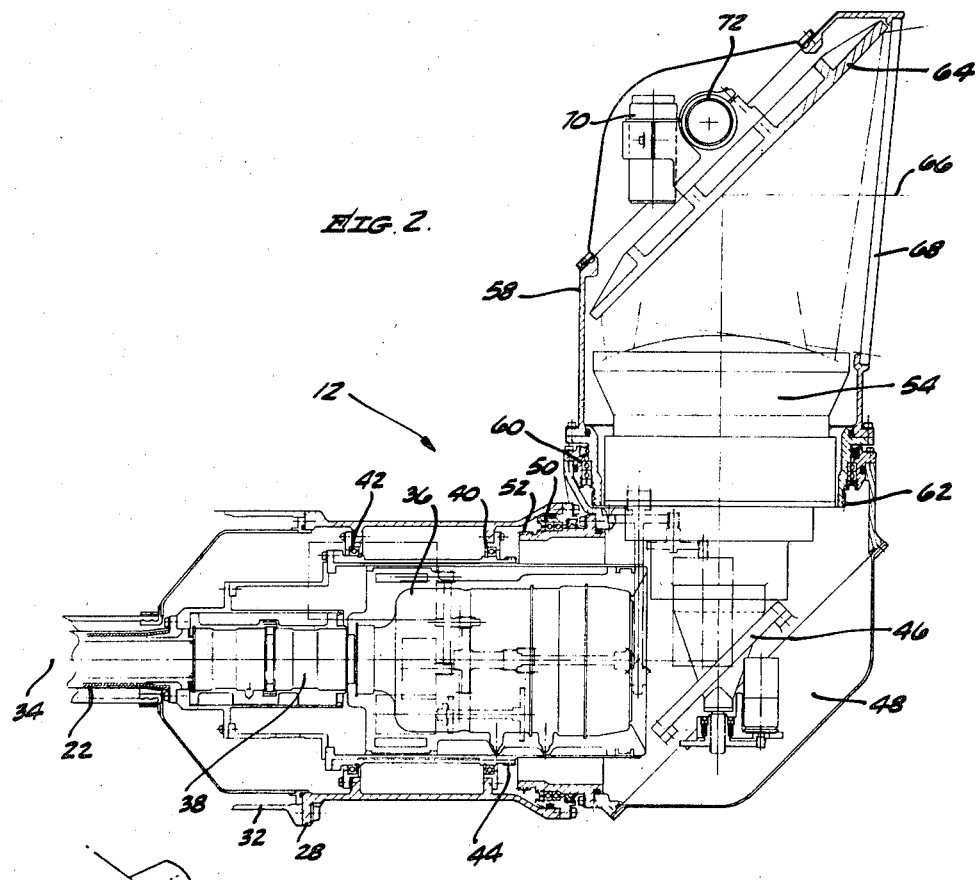
FIG. 2 is an enlarged partial front elevational view and partial section taken generally along the line 2—2 of FIG. 1.

Camera 12 is seen in more detail in FIG. 2, and is distinguished by the fact that it is connected by fiber optic bundle 22 to eyepiece 24. On the other hand, camera 14 contains a vidicon providing an electronic signal corresponding to the image. This signal is displayed at least upon display tube 26, which is positioned before the helicopter pilot, and is also preferably displayed on suitable display tubes before the gunner-copilot and the observer, if any.

Cameras 12 and 14 respectively have frames 28 and 30, see FIGS. 2 and 3, which are stationarily mounted by securement to attachment points on the front of the helicopter. The stationary frames are joined by shroud 32, see FIG. 1, which joins the two cameras to make a unitary structure thereof. In order to provide viewing flexibility, the cameras have sufficient flexibility to be able to direct the view in any desired direction. The cameras of FIGS. 2 and 3 are similar, and for convenience, camera 12 of FIG. 2 will be explained in more detail.

Frame 28 has an axis 34. Rotatably mounted upon the axis is image intensifier 36. Image intensifier 36 is of such construction that the size ratio of the output image with respect to the input image can be changed. Thus, image intensifier 36 has zoom characteristics. Additional, nonzoom image intensifiers can be connected to the output of intensifier 36. One of these additional intensifiers is indicated at 38. Fiber optic bundle 22 is connected to the output of intensifier 38, and the whole structure, including that end of the fiber bundle, is rotatably mounted with respect to the frame 28, on bearings 40 and 42, so that the whole structure can rotate on axis 34. Drive gear 44 rotates the structure. The drive means connected to ring gear 44, as well as the reason for rotation of the image intensifier and its connected structure, is described in more detail below.

Mirror 46 lies upon axis 34, at a 45° angle with respect thereto, and is mounted in mirror housing 48. Mirror housing 48 is rotatable on axis 34 by means of its being mounted upon bearings 50. Ring gear 52 is connected to mirror housing 48 to drive the mirror housing. It is seen that mirror 46 is on the optical axis of the intensifier, as well as being on the axis of rotation. Thus, the view seen by the intensifier, resulting solely from the rotation of the mirror housing, is a view lying upon the plane at right angles to the axis of rotation. Additionally, lens assembly 54 is a group of lenses which form an objective to form the image for the intensifier. Lens assembly 54 is mounted upon mirror housing 48 and defines the optical axis to mirror 46. As previously indicated, mirror 46 is at 45° with respect to the optical axis 34, and thus the axis 56 through the lens assembly 54 is at right angles to the axis 34.

Gyro housing 58 is rotatably mounted upon mirror housing 48, upon bearings 60. This permits rotation of gyro housing 58 upon optical axis 56. Additionally, ring gear 62 is mounted on gyro housing 58 so that the housing can be rotated upon axis 56. Mirror 64 is mounted at 45° with respect to axis 56 to produce an optical axis 66 which is directable at any selected scene. Front opening 68 is glass covered to protect the internal structure from external conditions.

Gyros 70 and 72 are mounted to move with mirror 64. Thus, they are responsive to all motion of the mirror 64. By rotating a mirror through an angle about the reflected optical axis causes an identical field-pointing change. Therefore, inertial reference devices mounted on the mirror support structure orthogonal to the incoming optical axis remain aligned through all mirror rotations. The housings function as gimbals for inertia reference, pointing members, and sealed outer covers for internal protection. From this construction, it is clear that the optical axis 66 can be directed at any scene which is not obstructed by vehicle 10, or for which the motion of the parts is not obstructed by the vehicle 10.

Figure 4:
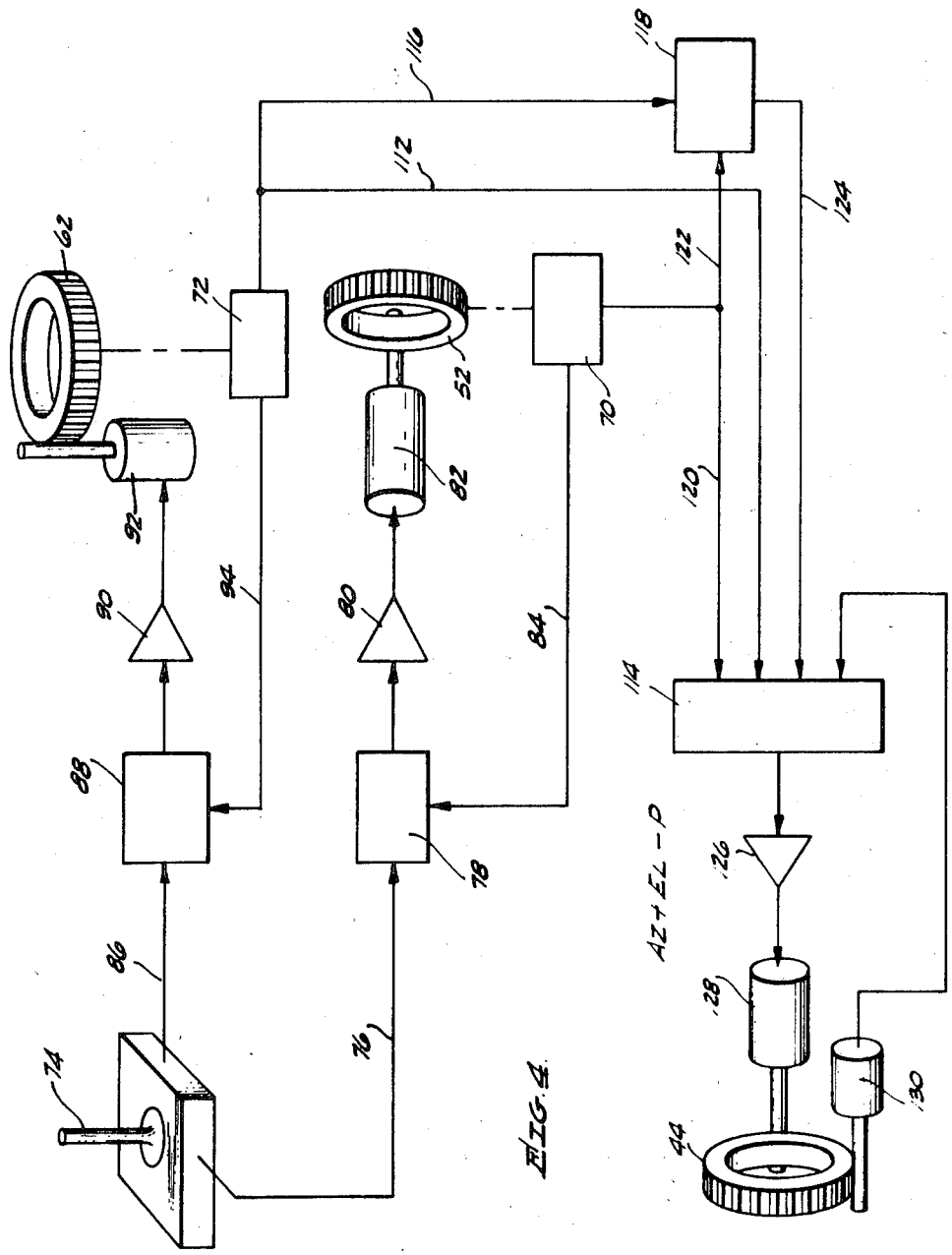
FIG. 4 is a structural block diagram showing the image-forming device drive means.

Referring to FIG. 4, the structural schematic of the manner of control of the direction of optical axis 66 is shown therein. Control handle 74 is movable in the direction to make elevational changes. An elevational change is signalled in line 76 to summer 78. The output of summer 78 goes through amplifier 80 to motor 82 which drives ring gear 52. The motion of ring gear 52 causes an output signal from gyro 70, as by means of a suitably attached resolver, so that an output signal resulting from this elevational motion is present in signal line 84. This is a negative feedback signal and line 84 is connected to summer 78 so that the amount of elevational displacement of ring gear 52 is a function of the input signal to control handle 74.

Similarly, an azimuthal change is signalled from control handle 74 to line 86. Line 86 is connected to summer 88. The output of summer 88 is connected through amplifier 90 to motor 92 which is in turn connected to drive ring gear 62 to move the optical axis 66 in the azimuthal direction. Gyro 72 senses this motion and has an output signal in signal line 94 which acts as a negative feedback to summer 88 so that ring gear 62 and the structure carried thereby rotates a appropriate amount in the azimuthal direction, corresponding to the azimuthal demand motion of control handle 74.

FIG. 3 shows a similar view of remote view camera 14. This camera includes a zoom image intensifier 96 to which is directly coupled vidicon 98. Vidicon 98 has an electronic output signal which is visible upon at least display tube 26. Both the image intensifier 96 and vidicon 98 are rotatable in frame 30 on bearings 100, upon axis 102. Axis 102 is preferably parallel to axis 34, not necessarily in line therewith. Furthermore, both axes 34 and 102 are fixed with respect to the vehicle. Mirror housing 104 is rotatable on axis 102, and gyro housing 108 is rotatable on axis 106 to thereby permit the optical axis 110 out of the final viewport to be directed in any desired direction, consistent with the mechanical constraints of the system. Each of the housings contains equipment similar to that previously described with respect to the direct view camera 12, except for the replacement of the fiber optic bundle 22 of camera 12 with the vidicon 98 of camera 14. Controls identical to those in FIG. 4 are applied to control the direction of axis 110.

It is advantageous to provide for rotation in the elevational direction at the first rotation upon the fixed frame. This is because, within the constraints or limits imposed by the mounting upon the vehicle, a greater angle of view is obtainable by having the first direction of rotation being on the elevational direction. Another reason for providing this as a first motion, is that the elevational rotation is the rotation closest to the frame on the searchlights, as well as the guns. Thus, the two systems can be interlocked by simple position-signalling devices, without need for coordinate transformation. However, providing the first rotation upon the horizontal axis so that elevation of the first direction of rotation is opposite from that employed by man when he looks at a scene. Man preferentially first makes his azimuthal movement, and then the elevational, and it is in this manner of viewing the scene that the scene remains upright. When the elevational adjustment is made first, and then the azimuthal, the scene is rotated. The amount of rotation is a function of both the elevational and azimuthal angles. Thus, the image-intensifiers 36 and 96 are rotatably mounted in the frame so that corrective rotation can be made of the intensifiers to provide an upright-appearing scene to viewers. Rotation is necessary both in the direct and remote view cameras in order to provide this correction.

Referring again to FIG. 4, line 112 transmits the azimuthal rotational angle from the zero centerpoint to summer 114, while line 116 transmits this angle to signal processor 118. Similarly, line 120 transmits the elevational angle to summer 114 and line 122 transmits the elevational angle to signal processor 118.

Signal processor 118 processes the input signals so that its output in line 124 to summer 114 is negative corresponding to the angle which has a sine equal to the product of the sines of the azimuthal and elevational angles. The output of the summer 114 is thus the sum of the azimuthal and elevational angles minus the angle which has as its sine the products of the sines of the azimuthal and elevational angles. This signal is fed to amplifier 126 and thence to motor 128 which drives ring gear 44. Negative feedback from signal means 130 is connected to summer 114 to close the feedback loop. Accordingly, the image intensifier, and thus the image, is rotated in appropriate amount so that the image seen by the viewer is and remains upright.

This invention having been described in its preferred embodiment, it is clear that it is susceptible to numerous modifications and embodiments within the ability of those skilled in the art and without the exercise of the inventive faculty.

What is claimed is:

1. A camera-pointing system, said camera-pointing system comprising:
a frame, said frame having an axis, said frame being arranged to be secured;
image-forming means mounted in said frame so that the axis of said frame forms the optical axis of said image-forming means;

a first mirror movably mounted on said axis to rotate on said axis, said mirror being positioned at an angle with respect to said axis to define an image path at an angle to said axis so that rotation of said first mirror on said axis causes said image path to describe a conical surface about said axis;

a second mirror positioned on said image path and movably mounted to rotate about said image path, said second mirror thus defining the axis of view direction so that rotation of said second mirror on said image path causes the axis of view direction to described a conical surface about said image path, so that the direction of orientation of said axis of view direction is determined by the rotation of said first and second mirrors on their respective axes, without motion of said axis of said image-forming device.

2. The camera-pointing system of claim 1 wherein first drive means is connected to said first mirror to rotate said first mirror about said axis of said image-forming means and second drive means is connected to rotate said second mirror about said image path, and control means is connected to said drive means to control the direction of view.

3. A camera-pointing system, said camera-pointing system comprising:

a frame, said frame having an axis, said frame being arranged to be secured;

image-forming means mounted in said frame so that the axis of said frame forms the optical axis of said image-forming means;

a first mirror movably mounted on said axis to rotate on said axis, said mirror being positioned at an angle with respect to said axis, first drive means connected to said first mirror to rotate said first mirror about said axis of said image-forming means, said first drive means including a first ring gear connected to rotate said first mirror and a first motor connected to drive said first ring gear;

a second mirror positioned on said image path and movably mounted to rotate about said image path, said second mirror thus defining the axis of view direction, second drive means connected to rotate said second mirror about said image path, said second drive means including a second ring gear connected to rotate said second mirror and a second motor connected to drive said second ring gear, so that the direction of orientation of said axis of view direction is determined by rotation of said first and second mirrors on their respective axes, without motion of said axis of said image-forming device; and control means connected to said first and second drive means to control the direction of view.

4. A camera-pointing system, said camera-pointing system comprising:

a frame, said frame having an axis, said frame being arranged to be secured;

image-forming means mounted in said frame so that the axis of said frame forms the optical axis of said image-forming means;

a first mirror movably mounted on said axis to rotate on said axis, said mirror being positioned at an angle with respect to said axis to define an image path at an angle to said axis, first drive means connected to said first mirror to rotate said first mirror about said axis, first sensing means connected to said first mirror to sense motion of said first mirror with respect to said frame;

a second mirror positioned on said image path and movably mounted to rotate about said image path, said second mirror thus defining the axis of view direction, second drive means connected to rotate said second mirror about said image path, sensing means connected to said second mirror to sense motion of said second mirror with respect to said frame; and control means connected to said drive means to control the direction of view, said sensing means being connected to said control means to feed back a signal to said control means indicating the positions of said first and second mirrors.

5. The camera-pointing system of claim 4 wherein said sensing means comprises at least one gyro mounted upon said second mirror.

6. A camera-pointing system, said camera-pointing system comprising:

a frame, said frame having an axis, said frame being arranged to be secured;

image-forming means mounted in said frame so that the axis of said frame forms the optical axis of said image-forming means;

a first mirror movably mounted on said axis to rotate on said axis, said mirror being positioned at an angle with respect to said axis to define an image path at an angle to said axis;

a second mirror positioned on said image path and movably mounted to rotate about said image path, said second mirror thus defining the axis of view direction, so that the direction of orientation of said axis of view direction is determined by rotation of said first and second mirrors on their respective axes, without motion of said axis of said image-forming device; and a lens positioned between said first and second mirrors to focus an image on said image-forming means.

7. A camera-pointing system, said camera-pointing system comprising:

a frame, said frame having an axis, said frame being arranged to be secured;

image-forming means mounted in said frame so that the axis of said frame forms the optical axis of said image-forming means, said image-forming means comprising an image intensifier, said image intensifier being rotatably mounted in said frame on said axis;

a first mirror movably mounted on said axis to rotate on said axis, said mirror being positioned at an angle with respect to said axis to define an image path at an angle to said axis;

a second mirror positioned on said image path and movably mounted to rotate about said image path, said second mirror thus defining the axis of view direction, so that the direction of orientation of said axis of view direction is determined by the rotation of said first and second mirrors on their respective axes, without motion of said axis of said image-forming device.

8. The camera-pointing system of claim 7 wherein drive means is connected to rotate said image intensifier with respect to said frame on said axis, sensing means connected to said mirrors to detect rotation of said mirrors on said mirror rotation axes, said sensing means being connected to said drive means to rotate said image intensifier as a function of mirror rotation.

9. The camera-pointing system of claim 8 wherein a vidicon is mounted on said axis of said image intensifier, said vidicon-receiving optical signals from said image intensifier and rotating with said image intensifier.

10. The camera-pointing system of claim 8 wherein a fiber optic bundle has its first end connected to said image intensifier, said first end of said fiber optic bundle rotating with said image intensifier.

11. The camera-pointing system of claim 8 wherein said function of image intensifier angular rotation is that the image intensifier rotates an angle equal to the sum of the angles of rotation of said first and second mirrors.

* * * * *

PO-1050
(5/69)

UNITED STATES PATENT OFFICE
CERTIFICATE OF CORRECTION

Patent No. 3,634,622          Dated January 11, 1972

Inventor(s) Bryce A. Wheeler

It is certified that error appears in the above-identified patent and that said Letters Patent are hereby corrected as shown below:

Column 5, line 30, after "to said axis", insert --to define an image path at an angle to said axis--
    (Amendment dated May 28, 1971, page 3, line 2)

Signed and sealed this 5th day of December 1972.

(SEAL)
Attest:

EDWARD M. FLETCHER, JR.
Attesting Officer

ROBERT GOTTSCHALK
Commissioner of Patents